(12) United States Patent
Kinder et al.

(10) Patent No.: US 10,594,573 B2
(45) Date of Patent: Mar. 17, 2020

(54) SYSTEMS AND METHODS FOR RULE QUALITY ESTIMATION

(71) Applicant: SECUREWORKS HOLDING CORPORATION, Atlanta, GA (US)

(72) Inventors: Ross R. Kinder, Ann Arbor, MI (US); Jon R. Ramsey, Atlanta, GA (US); Timothy M. Vidas, Omaha, NE (US); Robert Danford, Boulder, CO (US)

(73) Assignee: SecureWorks Corp., Wilmington, DE (US)

( * ) Notice: Subject to any disclaimer, the term of this patent is extended or adjusted under 35 U.S.C. 154(b) by 613 days.

(21) Appl. No.: 14/991,641

(22) Filed: Jan. 8, 2016

(65) Prior Publication Data

US 2017/0201431 A1 Jul. 13, 2017

(51) Int. Cl.
*H04L 12/26* (2006.01)
(52) U.S. Cl.
CPC .......... *H04L 43/028* (2013.01); *H04L 43/08* (2013.01)
(58) Field of Classification Search
CPC .............................. H04L 43/028; H04L 43/08
USPC ......................................................... 709/224
See application file for complete search history.

(56) References Cited

U.S. PATENT DOCUMENTS

| | | | |
|---|---|---|---|
| 6,662,184 B1 * | 12/2003 | Friedberg | G06F 16/322 707/754 |
| 7,299,292 B2 | 11/2007 | Morten et al. | |
| 7,685,271 B1 * | 3/2010 | Schneider | H04L 63/1416 709/204 |
| 8,286,228 B2 | 10/2012 | Venters, III et al. | |
| 8,417,783 B1 * | 4/2013 | Sharma | H04L 51/12 709/206 |
| 2008/0215518 A1 * | 9/2008 | Matsuda | H04L 63/02 706/47 |
| 2009/0119584 A1 * | 5/2009 | Herbst | G06F 17/30731 715/273 |
| 2010/0180080 A1 | 7/2010 | Lin et al. | |
| 2013/0304742 A1 * | 11/2013 | Roman | G06F 16/285 707/740 |
| 2014/0250501 A1 | 9/2014 | Berard et al. | |
| 2015/0081662 A1 * | 3/2015 | Salaka | G06Q 30/0625 707/707 |
| 2015/0363215 A1 * | 12/2015 | Versteeg | G06F 11/3684 703/23 |

* cited by examiner

*Primary Examiner* — Chris Parry
*Assistant Examiner* — Adam A Cooney
(74) *Attorney, Agent, or Firm* — Larson Newman, LLP

(57) ABSTRACT

A method of assessing the quality of a network filter rule containing a wildcard includes determine an instantaneous entropy for the network filter rule based on string distances or instantaneous entropy between a plurality of wildcard matches for the network filter rule. The method further includes performing an action if the string distance or instantaneous entropy for the network filter rule crosses a threshold. The action being selected from disabling the network filter rule, flagging the rule as a low quality rule, generating a candidate rule based on a portion of the match having low entropy and a portion of the match having high entropy, or a combination thereof.

19 Claims, 3 Drawing Sheets

SYSTEMS AND METHODS FOR RULE QUALITY ESTIMATION

FIELD OF THE DISCLOSURE

The present disclosure generally relates to information handling systems, and more particularly relates to rule quality estimation.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
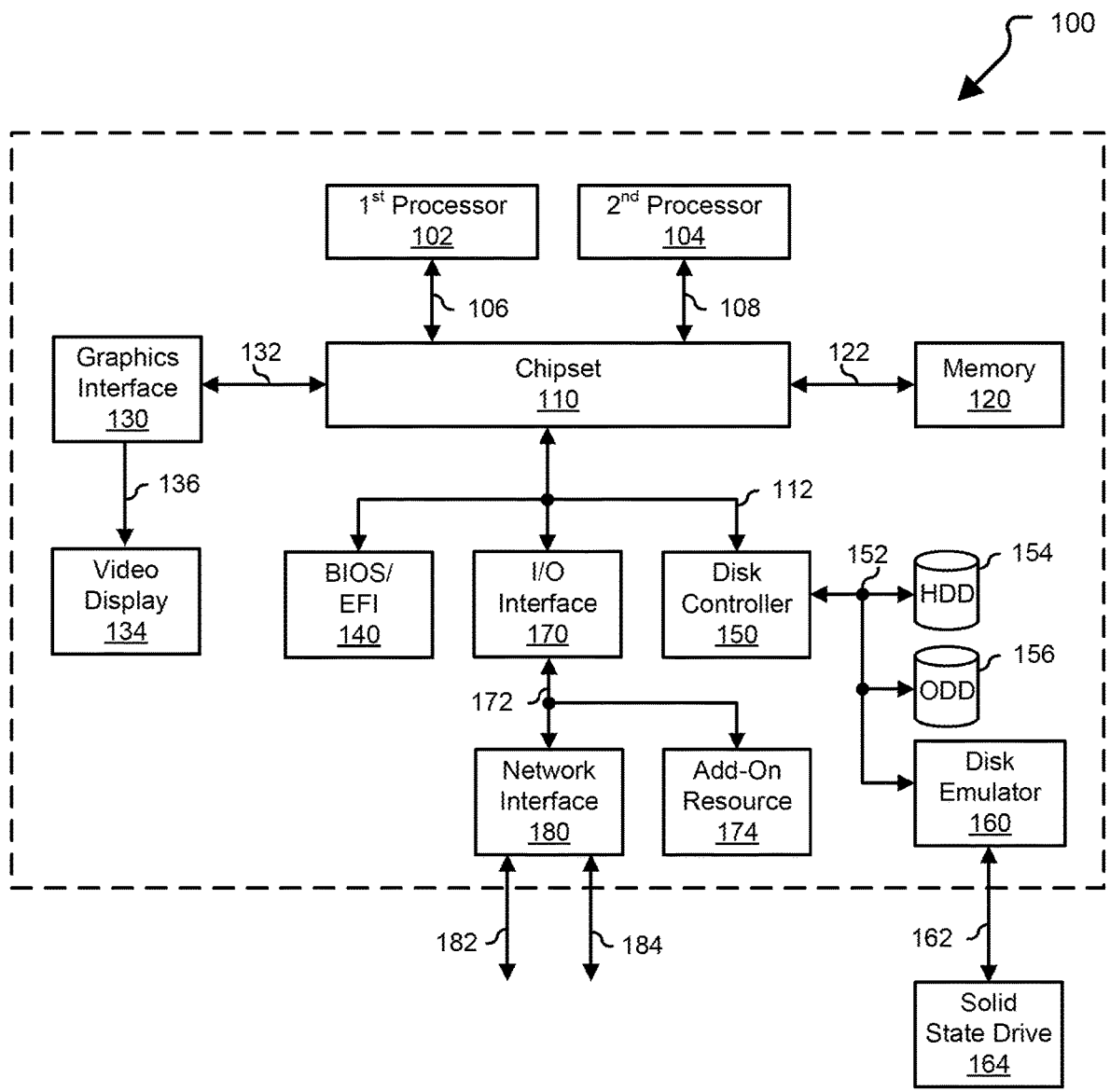
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1134 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

One challenge in creating and maintaining network rules is proper selection and use of wildcards in the network rule. For example, the following network rules illustrate various levels on specificity.

1. All websites allowed ("*")
2. Nothing except Google searches are allowed (https://www.google.com/search?q=*")
3. Nothing except Google searches for pictures are allowed (https://www.google.com/search?q=picture+of+*")
4. Nothing except Google searches for pictures of puppies are allowed (https://www.google.com/search?q=picture+of+puppies")

In each case, the wildcard "*" can be replaced by anything and the rule will still match. While it may be obvious that rule 1 is too broad, without knowledge of the intended application, an network administration may not know which of rules 2-4 are appropriate. Furthermore, as changing the rules may require an approval process, and there may be a tendency towards broader rules to avoid extended periods of downtime if a rule was too narrow and blocked needed traffic.

To aid in the evaluation for the rule quality, the wildcard matches of actual traffic allowed by the system can be evaluated. A rule that is too broad can have matches to the wildcard that are all very similar. For example, if the network administrated opted for rule 2, allowing all Google searches, but the application only performs Google searches for pictures, then all the wildcard matches would begin with "pictures+of+", indicating that the rule was too broad.

Figure 2:
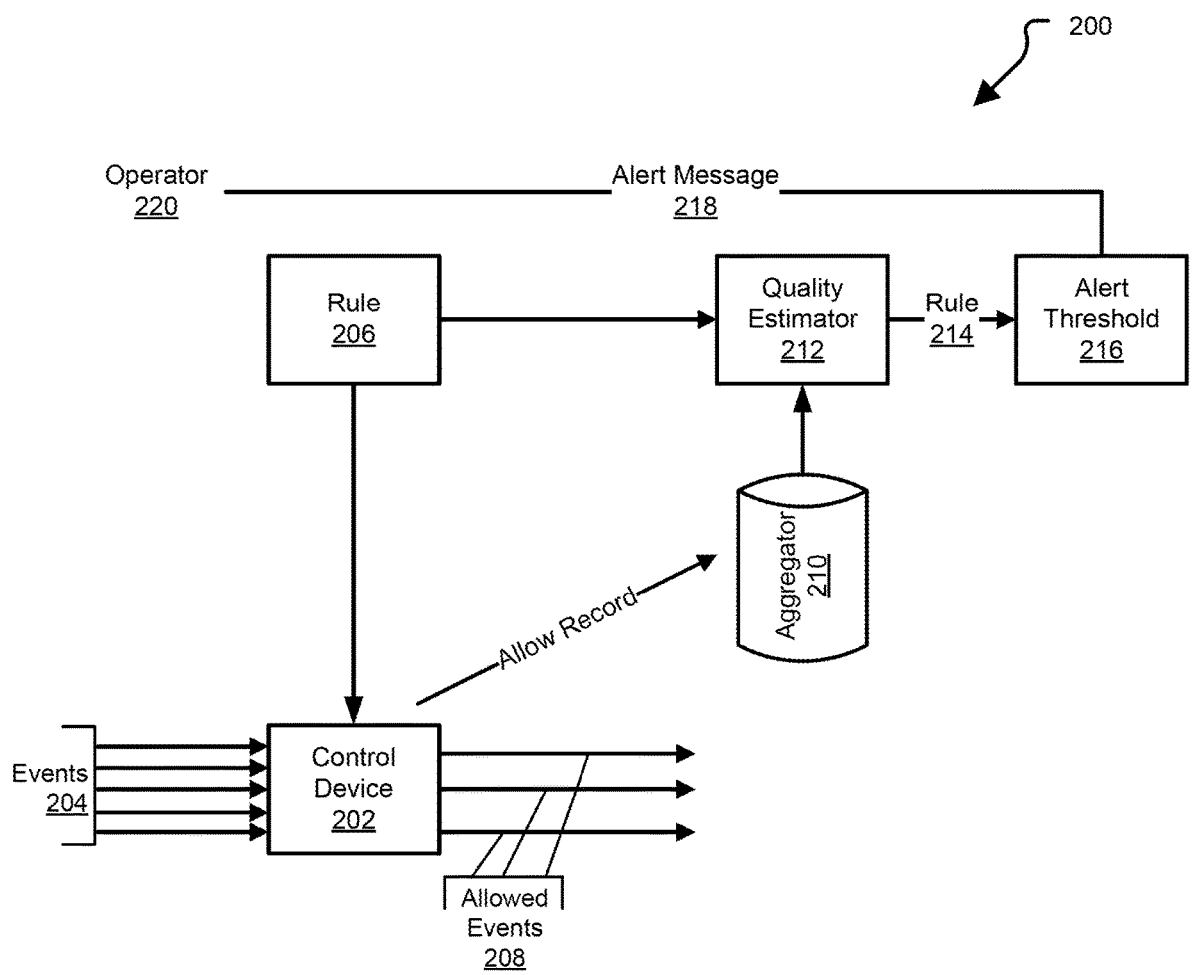
FIG. 2 is a block diagram illustrating a system for estimating the quality of network filtering rules, in accordance with various embodiments.

FIG. 2 shows a system 200 for evaluating rule quality. The system can include a control device 202. The control device 202 can filter network events 204 according to a set of rules 206. Rules 206 can include rules for allowing or denying network traffic. In some instances, the rules can include wildcards to allow for traffic that matches a pattern but does not exactly match a phrase. Events 204 matching a rules 206 to allow network traffic can be passed through the control device as allowed events 208. Events 204 that are disallowed by rules 206 can be blocked.

Control device 202 can record the match for all allowed traffic to the aggregator 210. Aggregator 210 can store the matches for a number of recent allowed events. In various embodiments, aggregator 210 can store the entire match string, including the fixed and variable parts. Alternatively, aggregator 210 can store only the wildcard match. Aggregator 210 may be configured as a FIFO queue of matches, such that only the last N allowed events are stored.

Rule quality estimator 212 can retrieve rules 206 and allowed traffic matches from aggregator 210 to evaluate the quality of rules 206. Rule quality estimator 212 can compare the wildcard matches from aggregator 210 to a rule from rule 206 to determine a similarity between the matches. In various embodiments, the similarity may be computed as a string difference, such as a Levenshtein distance. In other embodiments, the entropy can be estimated, such as by using a histogram entropy estimate.

In various embodiments, the rule quality estimate can take into account substrings within the wildcard match that may correspond to slowly changing substrings like dates, times, and sequence numbers. For these substring, the matches in a given period of time may be substantially similar, leading to an apparent high similarity, but over a longer period of time may have more significant differences. For example, over the course of a day, a date portion of the match may not change, but using an exact match the a month portion based on the month not changing for several days could lead to incorrectly blocked events the month.

Rule quality estimator 212 can calculate a score 214 based on the apparent differences between the wildcard matches. If, score 214 exceeds an alert threshold 216, an alert message 218 can be sent to an operator 220 to warn of a potential low quality rule. In various embodiments, the operator may review the potential low quality rule and consider a change.

In various embodiments, the rule may be disabled or an alternative rule can be suggested to the operator. For example, the wildcard match can be subdivided into substantially fixed regions and variable regions. A suggested alternative rule may include the substantially fixed regions as an exact match part of the rule while leaving wildcards to match the variable regions.

Referring back the earlier example, if rule 2 matching all Google searches was original configured, yet an application only searches for pictures, the rule quality estimator 212 may identify "pictures+of+" as a substantially fixed portion of the wildcard match, and the remaining portion as a variable region. The suggested alternative rule may correspond to rule 3 that only matches searches for pictures with "pictures+of+" as part of the exact match portion and leave a wildcard in place for the variable regions.

Figure 3:
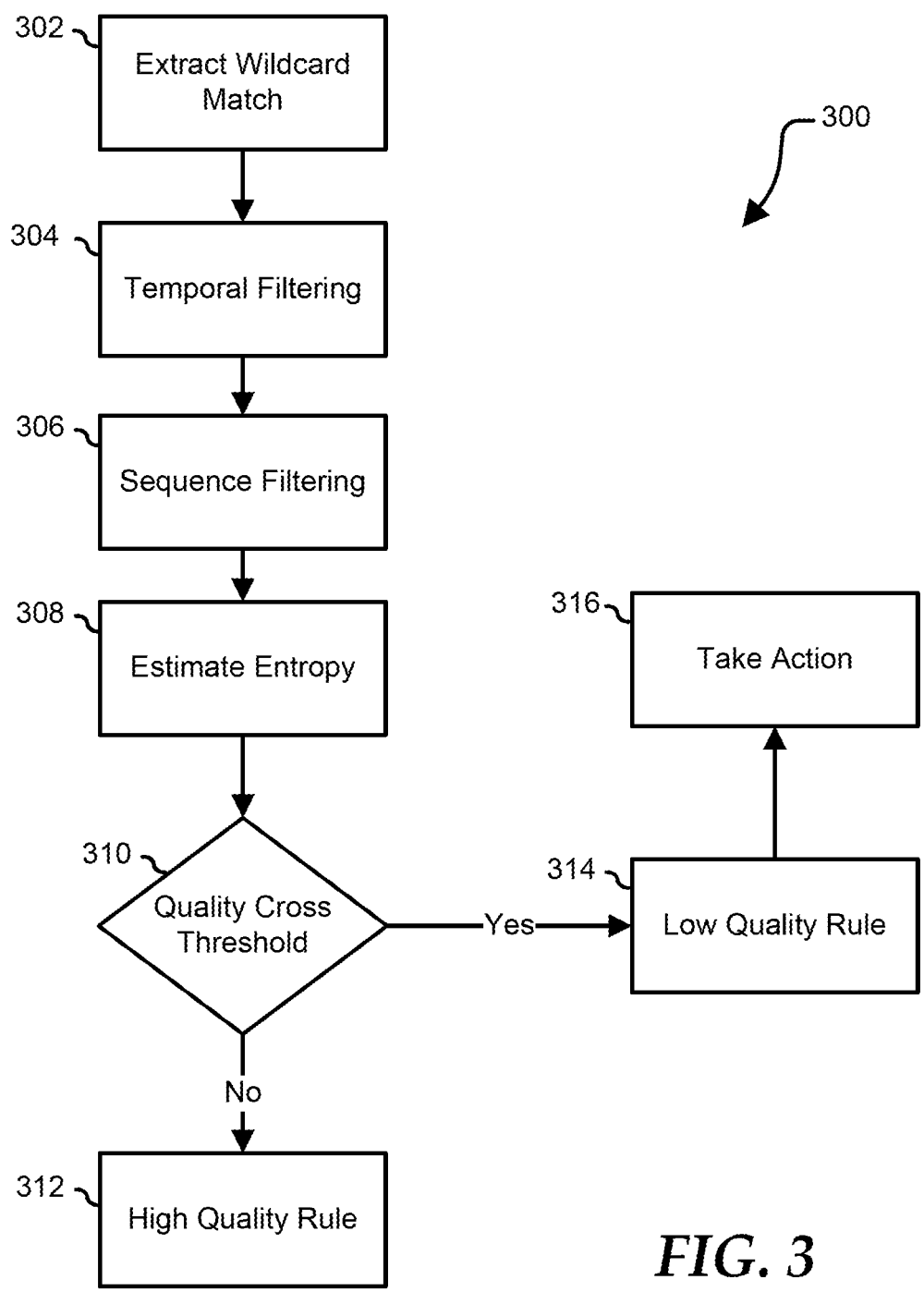
FIG. 3 is a flow diagram illustrating an exemplary method for estimating the quality of network rules, in accordance with various embodiments.

FIG. 3 is a flow diagram illustrating an exemplary method of evaluating rule quality. At 302, the system can extract a plurality of wildcard matches for a rule. The wildcard match can correspond to the substring of a network event that matches the rule. For example, if the rule filters access to webpages, the rule may match a URL. In various embodiments, a network filter can keep records of matches to allowed events for later rule evaluation.

At 304, the system can perform temporal filtering on the wildcard matches. Temporal filtering can identify portions or substrings of the wildcard match that may correspond to dates, times, and the like. These temporal substrings can change slowly over time, so looking at a short history can lead to identifying portions as having a lower diversity than they truly have. As such, the temporal filtering can replace the temporal substrings with random characters to replicate the diversity that actually exists for the temporal substrings.

At 306, the system can perform sequence filtering on the wildcard matches. Sequence filtering can identify portions or substrings of the wildcard match that may correspond to a sequence number. Similar to the temporal substrings, sequence substrings can change slowly over time and appear to have a lower diversity than the really have. Specifically, the sequence filter may identify substrings of decimal digits that appear to be an integer. The sequence filtering may also consider sequences of hexadecimal digits that appear to be a hexadecimal integer. In various embodiments, sequence integers may be stored in a queue, such as a FIFO queue. The queue may have a length L. In various embodiments, the length L may be in a range from about 5 to about 20, such as about 10. The potential sequence number can be compared to the integers within the queue, and may be consider a sequence by the sequence filter if it falls within the range of [i−2L, i+2L] for any integer i within the queue. When the potential sequence falls within the range for at least one integer in the queue, the integer can be added to the queue and the substring can be replaced with random characters to replicate the diversity that actually exists for the sequence substring.

At 308, the system can estimate the entropy for the plurality of wildcard matches. In various embodiments, the system can create a histogram of characters in the wildcard matches and use the histogram to estimate the entropy. Additionally, the system can score the rule based on the estimated entropy. In alternate embodiments, the system can score the rule based on the string distances between wildcard matches, such as an average string distance between a pairs of the plurality of wildcard matches.

At 310, the system can determine if the rule quality score crosses a threshold. When the rule quality score does not cross the threshold, the system can classify the rule as a high quality rule, as indicated by 312. Alternatively, when the rule quality score crosses the threshold, the system can classify the rule as a low quality rule, as indicated by 314. Additionally, at 316, the system can take an action in response to the rule being identified as a low quality rule. For example, the system can disable a low quality rule, flag the rule as a low quality rule and notify an operator to review the rule, suggest and/or implement a modified rule, or a combination thereof.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components.

Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method of assessing the quality of a network filter rule containing a wildcard, comprising:
    when the network filter rule is triggered, recording a string matching the wildcard as a wildcard match in a log;
    obtaining a plurality of strings from a plurality of wildcard matches for the network filter rule;
    determining an instantaneous string entropy for the network filter rule based on the plurality of strings, the instantaneous string entropy being a measure of similarity of the string matches calculated from a histogram of characters in the wildcard matches; and
    if the instantaneous entropy for the network filter rule crosses a threshold, flagging the rule as a low quality rule and generating a candidate rule based on a portion of the match having low entropy and a portion of the match having high entropy.

2. The method of claim 1, wherein the wildcard matches are obtained from an event log.

3. The method of claim 1, further comprising identifying a temporal substring of the wildcard match and replacing the temporal substring with random characters, the temporal sub string including text that matches a date, time, or event.

4. The method of claim 1, further comprising identifying a sequence substring of the wildcard match and replacing the sequence substring with random characters, the sequence substring including a sequence of decimal digits corresponding to a sequence number.

5. The method of claim 4, wherein a processor is further configured to store up to L sequence numbers from the wildcard matches.

6. The method of claim 5, wherein the sequence number is in a range of i−2L and i+2L, where i is one of the stored sequence numbers.

7. The method of claim 1, wherein the candidate rule includes the portion of the match having low entropy and a wildcard replacing the portion of the match having high entropy.

8. An information handling system, comprising:
    a storage for maintaining a list of network filter rules containing a wildcard and a log of network filtering events;
    a processor configured to:
        when the network filter rule is triggered, record a string matching the wildcard as a wildcard match in the log;
        obtain a plurality of strings from a plurality of wildcard matches for the network filter rule;
        determine an instantaneous string entropy for the network filter rule based on the plurality of strings, the instantaneous string entropy being a measure of similarity of the string matches calculated from a histogram of characters in the wildcard matches; and
        if the instantaneous entropy for the network filter rule crosses a threshold, flag the rule as a low quality rule and generate a candidate rule based on a portion of the match having low entropy and a portion of the match having high entropy.

9. The information handling system of claim 8, wherein the processor is further configured to identify a temporal substring of the wildcard match and replace the temporal sub string with random characters, the temporal sub string including text that matches a date, time, or event.

10. The information handling system of claim 8, wherein the processor is further configured to identify a sequence substring of the wildcard match and replace the sequence sub string with random characters, the sequence sub string including a sequence of decimal digits corresponding to a sequence number.

11. The information handling system of claim 10, wherein the processor is further configured to store up to L sequence numbers from wildcard matches.

12. The information handling system of claim 11, wherein the sequence number is in a range of i−2L and i+2L, where i is one of the stored sequence numbers.

13. The information handling system of claim 8, wherein the candidate rule includes the portion of the match having low entropy and a wildcard replacing the portion of the match having high entropy.

14. A method of assessing the quality of a network filter rule containing a wildcard, comprising:
    extracting a plurality of strings from a plurality of wildcard matches of the network filter rule from a log of network filtering events;
    determining an instantaneous string entropy for the network filter rule based on a string distance between the plurality of strings, the instantaneous string entropy being a measure of similarity of the string matches calculated from a histogram of characters in the wildcard matches; and if a score based on the string distance crosses a threshold, flagging the rule as a low quality rule and generating a candidate rule based on a portion of the match having low entropy and a portion of the match having high entropy, wherein the candidate rule includes the portion of the match having low entropy and a wildcard replacing the portion of the match having high entropy.

15. The method of claim 14, wherein the wildcard matches are obtained from an event log.

16. The method of claim 14, further comprising identifying a temporal substring of the wildcard match and replace the temporal substring with random characters, the temporal sub string including text that matches a date, time, or event.

17. The method of claim 14, further comprising identifying a sequence substring of the wildcard match and replace the sequence substring with random characters, the sequence substring including a sequence of decimal digits corresponding to a sequence number.

18. The method of claim 17, wherein the processor is further configured to store up to L sequence numbers from wildcard matches.

19. The method of claim 18, wherein the sequence number is in a range of i−2L and i+2L, where i is one of the stored sequence numbers.

\* \* \* \* \*